United States Patent [19]

Schulz, Jr.

[11] Patent Number: 4,556,297

[45] Date of Patent: Dec. 3, 1985

[54] OPTICAL COUNTING DEVICE

[75] Inventor: Frank C. Schulz, Jr., North Creek, N.Y.

[73] Assignee: Barton Mines Corporation, Inc., North Creek, N.Y.

[21] Appl. No.: 519,636

[22] Filed: Aug. 2, 1983

[51] Int. Cl.[4] .............................................. G02B 21/24
[52] U.S. Cl. ..................................................... 350/529
[58] Field of Search ............... 350/529, 536, 535, 534; 356/244

[56] References Cited

U.S. PATENT DOCUMENTS

| | | | |
|---|---|---|---|
| 1,630,146 | 5/1927 | Trenner | 350/535 |
| 1,647,865 | 11/1927 | Hausser | 350/535 |
| 1,693,961 | 12/1928 | Risch | 350/535 |
| 1,824,097 | 9/1931 | Ott | 350/535 |
| 1,918,351 | 7/1933 | Schulze | 350/535 |
| 2,328,585 | 9/1943 | Rooney | 350/535 |
| 3,141,548 | 7/1964 | Newby | 356/244 |
| 3,436,140 | 4/1969 | Lord | 350/535 |
| 3,495,926 | 2/1970 | Naz | 350/534 X |
| 3,556,633 | 1/1971 | Mutschmann et al. | 350/536 |

Primary Examiner—John K. Corbin
Assistant Examiner—Vincent J. Lemmo
Attorney, Agent, or Firm—Davis H. Semmes; Warren E. Olsen

[57] ABSTRACT

An optical counting device of the type used for counting mineral particles suspended within a liquid, for example, ore float tailings. The counting device includes a plate imprinted with a gridiron in its mid-portion, an absorbent doughnut pad removably supported upon the plate and conformed such that the gridiron on the plate is in register with the open space of the doughnut pad and a doughnut housing having an open space at its mid-portion defining a counting chamber in register with the gridiron and open space of the absorbent pad. The counting chamber facilitates a random distribution of suspended particles over the gridiron, while the suspending medium is withdrawn into the absorbent pad.

6 Claims, 5 Drawing Figures

U.S. Patent     Dec. 3, 1985     4,556,297
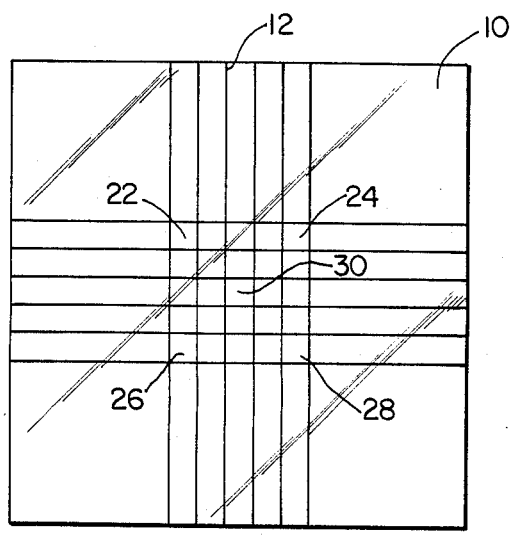
FIG. 1
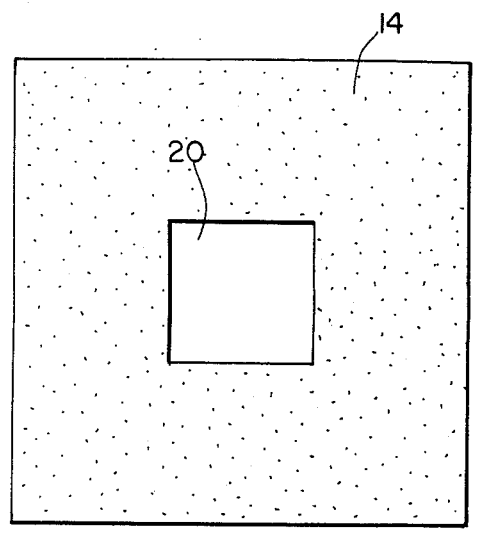
FIG. 2
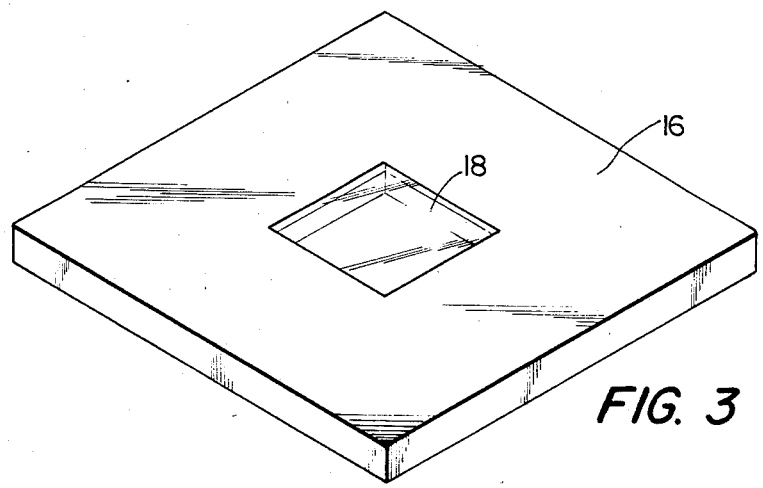
FIG. 3
FIG. 4
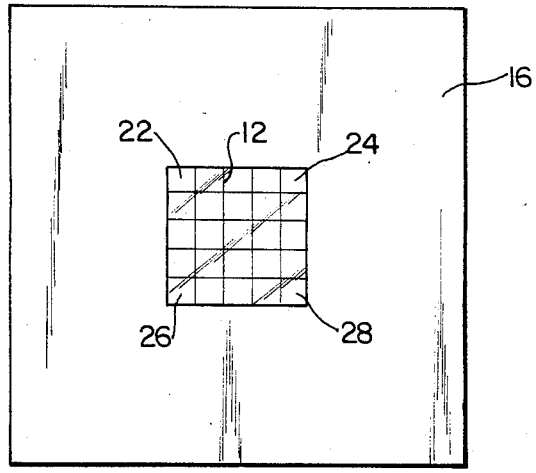
FIG. 5
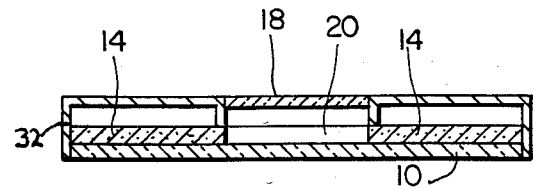

OPTICAL COUNTING DEVICE

BACKGROUND OF THE INVENTION

Field of the Invention

Optical counting devices, particularly slide and filter devices for meausirng and counting particulates suspended in liquid.

SUMMARY OF THE INVENTION

According to the present invention, particulates, such as garnet particles suspended within float tailings are permitted to settle upon a transparent plate having gridiron matrix, while the liquid fraction is absorbed within a surrounding absorbent doughnut pad. The count of particles may then be used to determine overall particulate weight and volume within the float tailings.

The transparent plate and absorbent doughnut pad are supported in abutment, such that the device may be readily used at the mine site. The transparent plate is imprinted with a gridiron, and the absorbent doughnut pad is fitted over the plate such that the gridiron is in register with the center of the doughnut. A housing engages pad and plate while defining a counting chamber, such that suspended particles on the gridiron may be counted and measured by microscopic examination or the like. The absorbent pad removes the fluid from the sample, while distributing the particles across the gridiron.

DESCRIPTION OF THE DRAWINGS

FIG. 1 is a plan view of the transparent plate or slide, employing an imprinted gridiron within its center portion;

FIG. 2 is a plan view of the absorbent doughnut pad, having an open space at its mid-portion in register with the gridiron;

FIG. 3 is a perspective view of the housing fitted over both the doughnut pad and the transparent slide, such that the grid-iron may be read through the mid-portion of the housing;

FIG. 4 is a plan view of the housing, showing the gridiron in register with the open space of the housing;

FIG. 5 is a transverse section of the housing, shown with its downwardly extending sides peripherally abutting the edges of the superposed transparent plate and absorbent doughnut filter.

DESCRIPTION OF THE PREFERRED EMBODIMENTS

In the mining of garnet it would be advantageous to be able to determine the amount of garnet present subsequent to the initial crushing of the ore and during the separation process. The garnet matrix varies considerably and conventional chemical analysis is costly and time consuming. According to the present invention, the analysis of mine tailings and float tailings obtained during the separation process in the mill would enable the plant operator to adjust the chemical "float" solution and, therefore, recover more of the garnet from the ore during the separation process. The analytical process is rapid and simple enough, so that the milling process may be adjusted accordingly, while separation is in progress.

The garnet, an iron-aluminum silicate mineral, is blood red in color, translucent to light and non-magnetic. The chemical and physical properties of garnet make it an ideal abrasive for glass and wood. Sandpaper and optical abrasives are the principal use for which garnet is mined.

There is no device or process currently in use which enables rapid analysis of the garnet in the ore. Conventional devices are neither effective nor accurate enough for any practical use.

The present device and method enables accurate and rapid determination of the amount of garnet in mine and float tailings. Accuracy is sufficient to a degree which makes its use cost effective in the processing of garnet ore.

The optical separator embodies a glass plate 10 having an imprinted grid 12 of known dimensions upon which a weighed sample in chemical suspension is poured. The suspended particulates settle onto grid 12, while the liquid fraction is absorbed by the surrounding absorbent and disposable doughnut pad 14 which is held in place by glass doughnut housing 16.

Using a base illuminated microscope and hand counter (not illustrated), the number of red crystal garnet particles is counted in each of the four corner squares 22, 24, 26, 28 and the center square 30, representing the statistical count for the entire grid and this number multiplied by 5 gives the number of particles of garnet for the weighed sample.

As indicated in FIGS. 2, 3 and 4 the absorbent doughnut filter embodies an open space 20 and the doughnut housing 16 embodies an open neck or counting chamber 18 in register with gridiron 30, such that the gridiron may be read through the open spaces.

As illustrated in FIG. 5, doughnut housing 16 may include downwardly extending sides 32 which encompass and peripherally abut the edges of absorbent pad 14 and glass plate 10. Housing neck portion 18 extends downwardly, so as to engage the edges of the absorbent pad open space 20. As thus fitted, the device is ready for an optical counting procedure.

A reference table of weights of the particles by size may be provided. Grid 30 may then be used to determine particle size, as well as distribution.

Example of Sample Analysis

A sample of ore float tailings is taken and weighed, for example, reading 28 grams (including both garnet and matrix). Using a known volume determined by standard displacement and adding sufficient distributing agent to make the sample 10 cc, this sample is poured onto gridiron 30 of tranaparent optical separator plate 10. A counting of the number of red garnet particles in each of the four corner and center squares gives a reading of 19. 19 particles×5 gives 95 particles in the known sample volume.

A reference table weight of 0.01 grams/particle gives 0.095 grams divided by 28 gram total sample equals 0.033 grams of garnet particles×100 equals 3.33% garnet.

Conventional determination of volume by displacement and weight of the sample using standard laboratory procedure, is not part of the present invention.

Standard procedure requires, however, an accurate determination of the weight/volume relationship of garnet ore and a table of known particle sizes and weights, based upon mesh size of the garnet, established from laboratory studies and average particle masses.

The distributing technique employed herein is unique in that it permits an even distribution of the garnet and matrix ore over the surface of the grid 30 and, then, the absorbent pad 14 removes the distributing agent by capillary action, leaving behind the particles and rendering the gridiron surface transparent.

As will be apparent, gridiron 30 and inner neck 18 define a counting chamber for determining garnet particle sizes. The inner neck contains the suspended articles within the distributing liquid and reduces the rate at which the distributing liquid is absorbed into pad 14, so as to provide a more even distribution of particles as they settle upon gridiron 30.

Once the mass has been weighed and the particle size determined, the present instrument permits rapid determination of the percent of garnet or particles per unit mass. The containment ring or inner neck 18 limits the spread of the articles in suspension to the grid area. Absorbent duplicate pad 14 draws off the suspending solution, while allowing the particles to be randomly distributed over the grid surface.

The size of the gridiron may be varied so as to allow larger particle measurement or permit the operator to simply estimate the size of the particles being counted. In most cases, the particles being counted will have a previously known mesh size. Also, of course, the matrix or plate 30 may be opaque, so as to permit measurement of particles which are transparent. According to the present invention, the distribution or withdrawal of the suspending liquid medium is slow enough to prevent disturbance of the random distribution of the particles, which are being measured upon the grid.

Manifestly, the gridiron may be variously sized and various doughnut configurations of pad and housing may be employed without departing from the spirit of invention.

I claim:

1. An optical counting device of the type used in counting garnet and like particles comprising:
   A. A transparent plate imprinted with a gridiron in its mid-portion;
   B. An absorbent pad, having an open space cut in its center, removably supported upon said plate and conformed such that the gridiron of the glass plate is in register with the open space of the absorbent pad; and
   C. A housing having an open space in register with said gridiron and said absorbent pad open space, said housing peripherally engaging the abutting edges of said plate and said pad.

2. An optical counting device as in claim 1, said gridiron having 1 mm interstices.

3. An optical counting device as in claim 1, said housing further including:
   i. downwardly extending sides abutting the peripheral edges of said transparent plate and said filter pad; and
   ii. a downwardly extending interior neck portion in register with said gridiron and engaging the edges of said absorbent pad open space, so as to define a counting chamber.

4. An optical counting device as in claim 3, wherein said transparent plate and absorbent pad are adapted to measure a sample having a volume of 10 cc.

5. An optical counting device as in claim 4, said absorbent pad being adapted to remove the liquid portion of the sample from the particulate portion of the sample, which remains upon the gridiron.

6. An optical counting device as in claim 5, wherein said absorbent pad is sufficient to withdraw liquid from the surface of said gridiron without upsetting random distribution of particles over the surface of the gridiron.

* * * * *